United States Patent [19]

Kuckuk

[11] Patent Number: 4,502,130
[45] Date of Patent: Feb. 26, 1985

[54] REMOVABLE MEMORY PACKAGE, ASSOCIATED APPARATUS AND METHOD OF USE

[75] Inventor: William R. Kuckuk, Grafton, Wis.

[73] Assignee: Square D Company, Palatine, Ill.

[21] Appl. No.: 377,899

[22] Filed: May 13, 1982

[51] Int. Cl.³ .............................................. G11C 13/00
[52] U.S. Cl. ........................................ 365/52; 365/72
[58] Field of Search ........................... 365/52, 72, 205

[56] References Cited

U.S. PATENT DOCUMENTS

| | | | |
|---|---|---|---|
| 3,883,856 | 5/1975 | Saito et al. | 365/52 |
| 3,922,649 | 11/1975 | Thome | 365/52 |
| 4,161,039 | 7/1979 | Rössler | 365/218 |
| 4,266,282 | 5/1981 | Henle et al. | 365/52 |

Primary Examiner—Terrell W. Fears
Attorney, Agent, or Firm—Richard T. Guttman; Donald P. Reynolds; James W. Potthast

[57] ABSTRACT

A memory package containing a nonvolatile electronic memory element and associated interface circuitry within a housing releasably connectable with a data entry panel of a controller to store program data from, and transmit program data to, the controller memory in the event of loss of program storage in the controller memory. The memory package is protectively mounted within the data entry panel and conveniently resides therein even when not being used.

3 Claims, 9 Drawing Figures

4,502,130

REMOVABLE MEMORY PACKAGE, ASSOCIATED APPARATUS AND METHOD OF USE

BACKGROUND OF THE INVENTION

This invention relates to removable electronic storage units suitable for use in programmable general purpose and welder controllers and the like and methods of using same.

Programmable controllers of the type which automatically control electronic devices, such as welders, to perform a plurality of functions in a particular sequence and in accordance with specified parameters are well known. Examples of such controllers are shown in U.S. Pat. Nos. 4,254,466; 4,282,417; 4,289,948 and 4,289,951 and reference may be made thereto for further and more detailed information.

Such controllers perform various specified functions in accordance with a computer program including a user portion which is established by the user of the unit being controlled. In the instance of a welder, the user by means of manipulation of the keyboard or other data entry devices will program, or enter, into the computer memory a weld schedule in which the particulars of each weld, such as weld time, cooling time and off time, are specified.

During use of the program, the user will debug the weld schedule program by making minor adjustments based on observation and testing of the quality of the welds produced in accordance with the program. For instance, the user may notice that weld number fourteen in the schedule is a cold weld and adjust the program accordingly to correct this problem.

A typical weld schedule may require a thousand program statements and take two to four hours to program and debug. Accordingly, a costly problem is created in terms of down time and programming time if a stored program is lost.

Memory storage of the user's program in a welder control may be lost in several ways. First, if the memory unit which stores the program is a volatile memory, then loss of power will cause loss of the stored program. Even if the memory is nonvolatile, erasure may happen by accident. Most importantly, regardless of whether the memory is volatile or not, electrical failures in the memory or in other circuitry contained within the same panel as the memory may occur. If so, in order to minimize down time, the defective panel with the stored program is removed for repair and a new panel with a blank memory is substituted for it. The new computer memory must then be reprogrammed.

A known solution to this problem has been to store the program on a magnetic tape after it has been completed. This, however, requires a computer data tape recording apparatus which is costly and cumbersome. Also, many such recorders require a standard AC power supply which is often not available at the welder control site.

SUMMARY OF THE INVENTION

The principal object of the present invention is to provide a memory package which can be used with programmable controllers and the like to alleviate the aforementioned problems of program memory loss.

Other objectives are to provide apparatus adapted to use such a memory package, to provide methods of using such a memory package and to otherwise provide an electronic memory package for general application which is convenient to use and inexpensive to make.

In a preferred embodiment, a memory package is provided comprising an electronic programmable, non-volatile, memory element, means for releasably connecting the memory element with external circuitry and means for interfacing said external circuitry and said memory for two-way communication therebetween.

In keeping with another aspect of the invention a data entry panel for a programmable controller is provided, comprising a data entry panel for a programmable controller, means for entry of data into a memory associated with the controller including a keyboard and interface circuitry controlled by said keyboard, means for releasably mounting a memory package to the panel with a memory element in releasable connection with said interface circuitry and means including the interface circuitry for transferring program information between said memory element and said controller memory for storage.

Another objective is to provide a data entry apparatus for providing data to a programmable controller, comprising a panel for mounting support of a data entry and control keyboard, an interface circuitry connected with and responsive to said keyboard and means for mounting a memory package to the housing in substantially flush relationship with the panel. In a preferred embodiment, the housing is mounted inside of the panel with its top surface in substantial flush relationship with the panel for protection of the memory package, for a neat appearance and to enable a flat cover to fit over the panel.

Another object is to provide a method of using a memory package with a controller to prevent inadvertent loss of stored control programs.

BRIEF DESCRIPTION OF THE DRAWING

The foregoing features and advantages will be described in greater detail and further advantageous features will become apparent from the following detailed description of the preferred embodiment which is given with reference to the several views of the drawing, in which.

DETAILED DESCRIPTION

Figure 1:
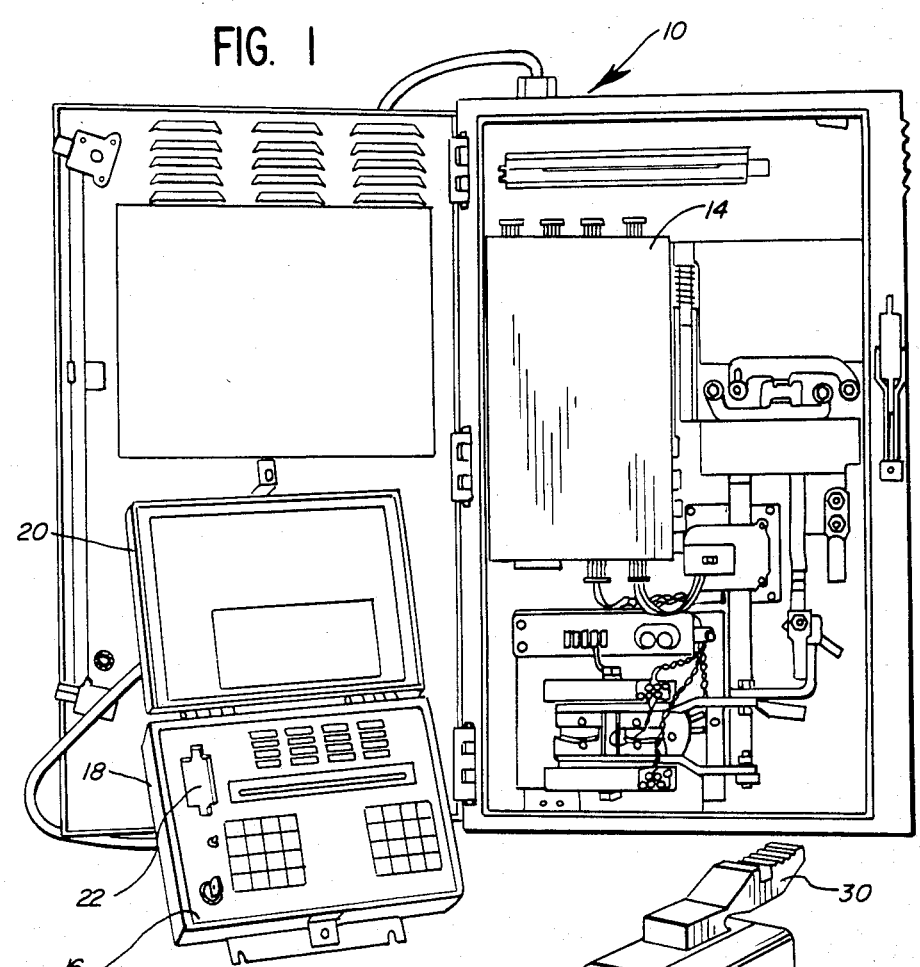
FIG. 1 is a perspective of a programmable welder control including the preferred embodiment of the data entry panel and the memory package used therewith.
Figure 2:
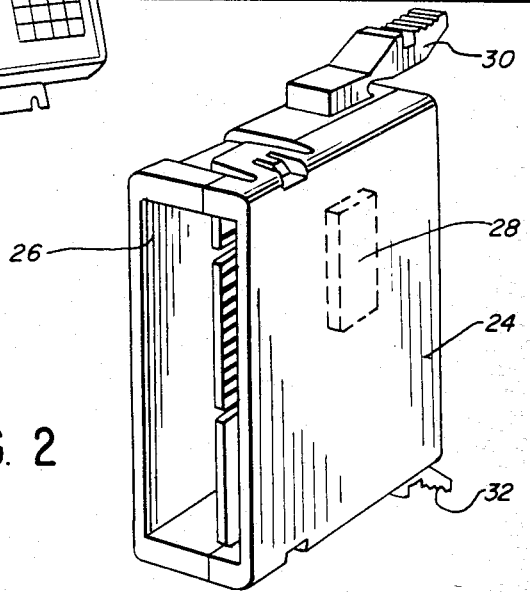
FIG. 2 is a perspective view of a preferred embodiment of the memory package, itself.

Shown in FIG. 1, is a programmable welder control 10 which employs the data entry panel 16 and memory package 12 of the present invention, as shown in FIG. 2. The welder control includes a logic panel 14 which contains a reprogrammable microprocessor including a volatile memory for storage used to control the welder. This data is programed, or written, into the users portion of the microprocessor memory by means of the data entry panel 16 and the circuitry associated therewith. The data entry panel is contained within a case 18 which has a hinged cover 20. Advantageously, the cover 20 protectively fits flush over the data entry panel even when the memory package 12 is residing within the receptacle slot 22. As will be illustrated in greater detail, the data entry panel 16 has a memory package receptacle slot 22 within which is received the memory package 12.

Referring particularly to FIG. 2, the memory package is seen to comprise a housing 24 having an open end 26 through which electrical contact access may be had to an electronic memory unit 28 contained within the housing. A pair of resilient locking tabs 30 and 32 on opposite sides of the housing 24 engage mating edges of slot 22 to secure the memory package therein. Reference may be made to the application of Wyler and Maggelet for "Memory Package" filed contemporaneously herewith for more detailed information.

Figure 3:
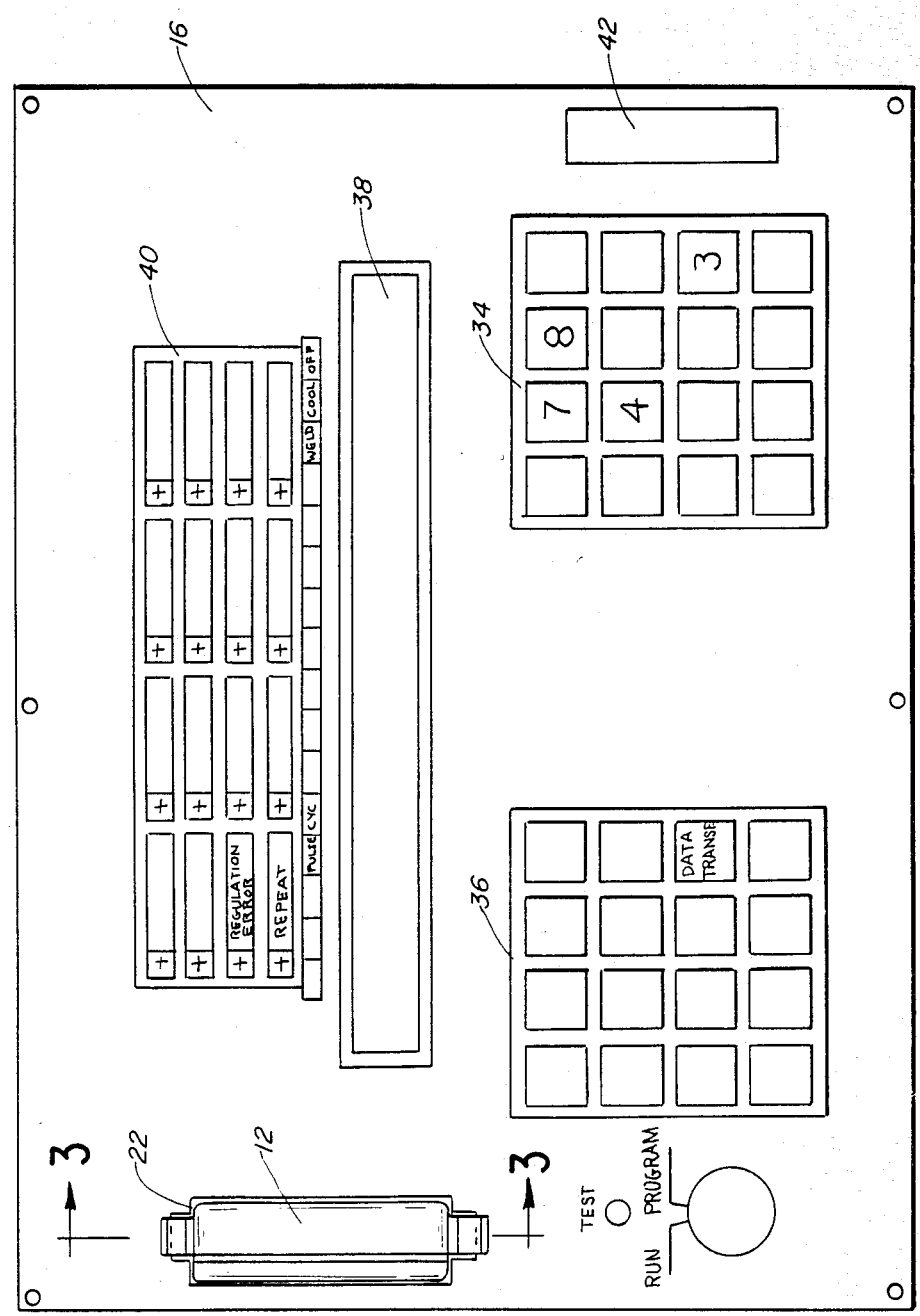
FIG. 3 is an enlarged plan view of the data entry panel shown in perspective in FIG. 1 and also illustrating the memory package inserted in the receptacle slot therein.

Referring to FIG. 3, the logic panel 16 is seen to include a numerical keyboard 34 for entering numerical data and a function keyboard 36 for controlling the panel 16. One such control function is associated with a push button switch labeled "Data Transfer". As will be explained below, circuitry associated with the data entry panel 16 and the "Data Transfer" switch is provided to enable the transfer of user program data from and to the memory package.

Figure 7A:
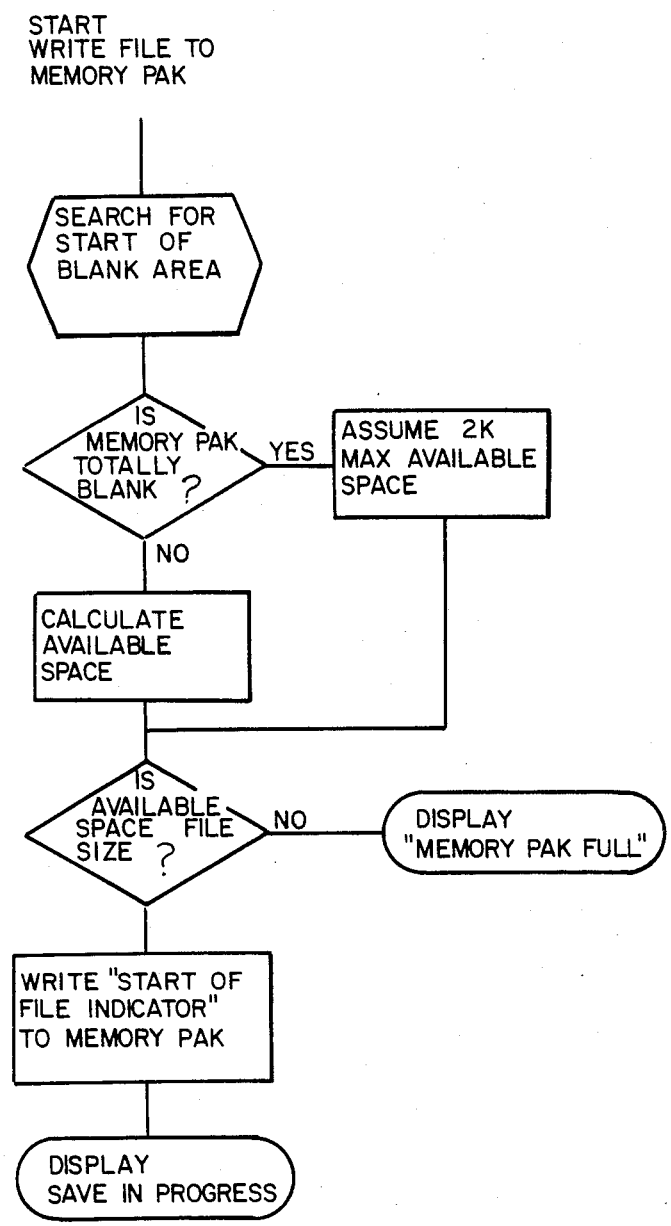
FIG. 7A is an algorithm for writing a file to the memory package.
Figure 7C:
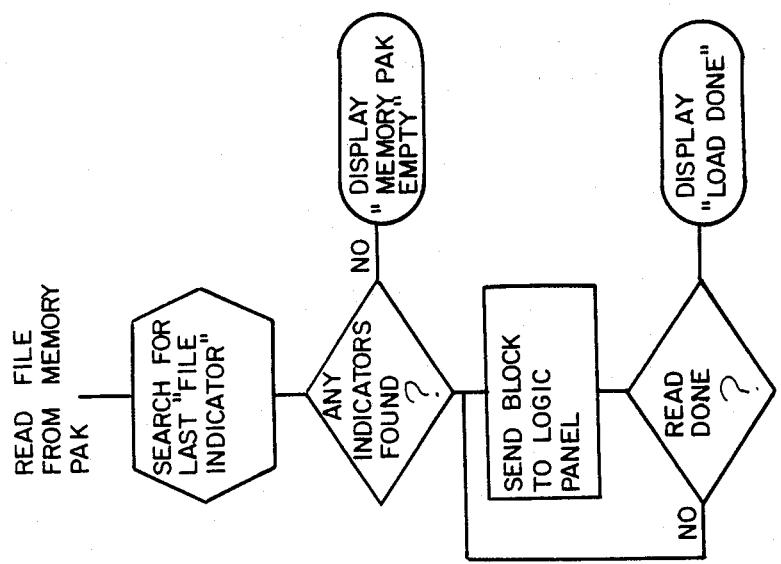
FIG. 7C is an algorithm for reading a file from the memory package.
Figure 7B:
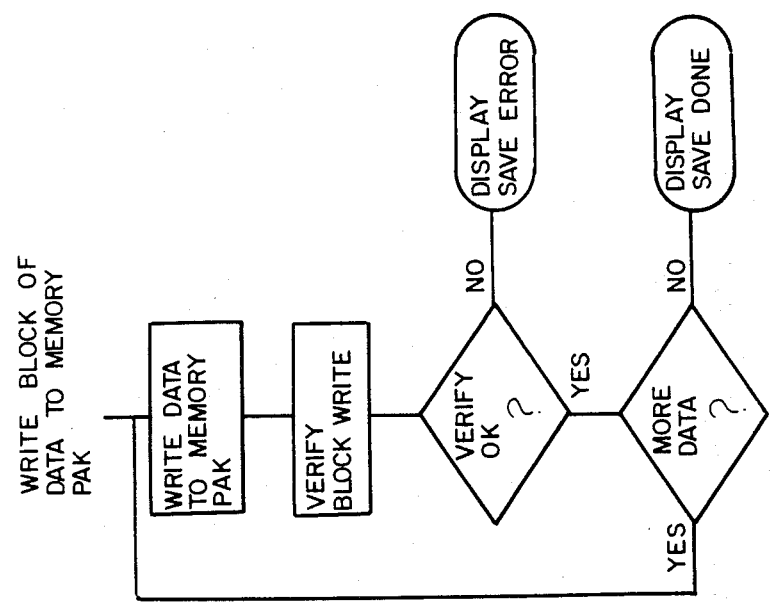
FIG. 7B is an algorithm for writing a block of data to the memory package.

The data entry panel 16 also contains a visual display panel 38 upon which is displayed the data being entered and various operator or functions messages. These messages are generated by a control microprocessor associated with the data entry panel which operates in accordance with the algorithm of FIGS. 7A, 7B and 7C. A status indicator panel 40 contains a plurality of lamps to indicate the status of the various controller and programming functions.

As seen in FIG. 3, the memory package 12 is inserted in slot 22. In addition to the capability of transferring data between the logic panel microprocessor memory and the memory package 12, program data may also be transferred to and from a magnetic tape when associated with a suitable high quality tape recorder (not shown). For this purpose, the data entry panel 16 is provided with another slot 42 for receipt of a cable connector from the magnetic tape recorder.

Figure 4:
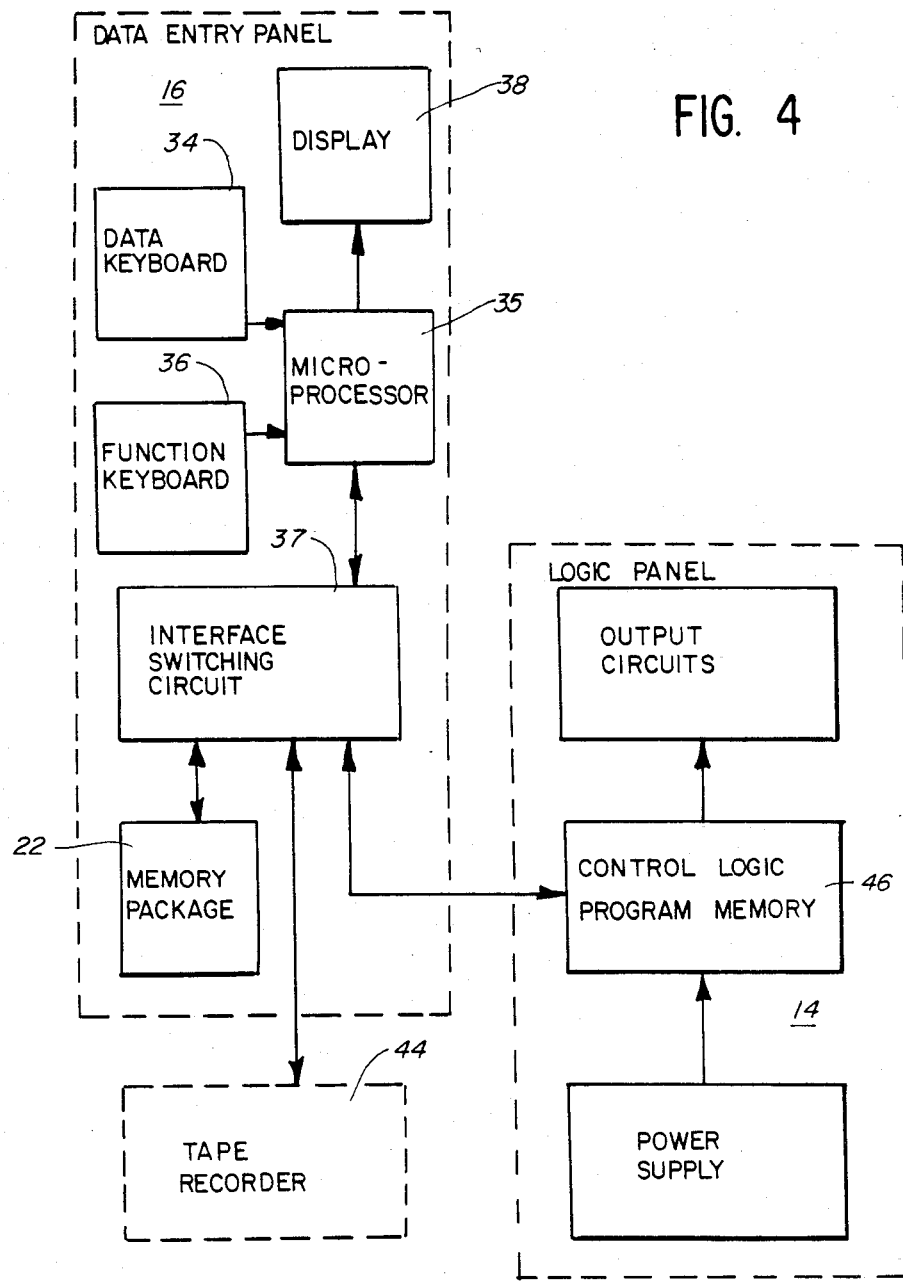
FIG. 4 is a block diagram illustrating the relationship between the memory package, the data entry panel, a tape recorder, if used, and the logic panel of a welder control.

Referring to FIG. 4, the data entry panel contains the memory package 22 as a self-contained unit. For purposes of memory transfer the memory package 22 can be coupled by means of an interface switching circuit 37 to either a tape recorder 44 or to the users portion of the microprocessor program memory 46 of the logic panel 14. This transfer is under control of a data entry panel microprocessor 35 and other circuitry responsive to the function keyboard 36 and the data keyboard 34. Unlike the tape recorder 44, the memory package 22 may be kept with the data entry panel 16. Because it is mounted flush with the panel 16, the cover 20 may be closed and the memory package protectively maintained in residence within the closed panel. The tape recorder 44, on the other hand, is a separate and bulky piece of equipment which often requires AC current of particular frequency or voltage characteristics which are not available at the welder site.

Figure 5:
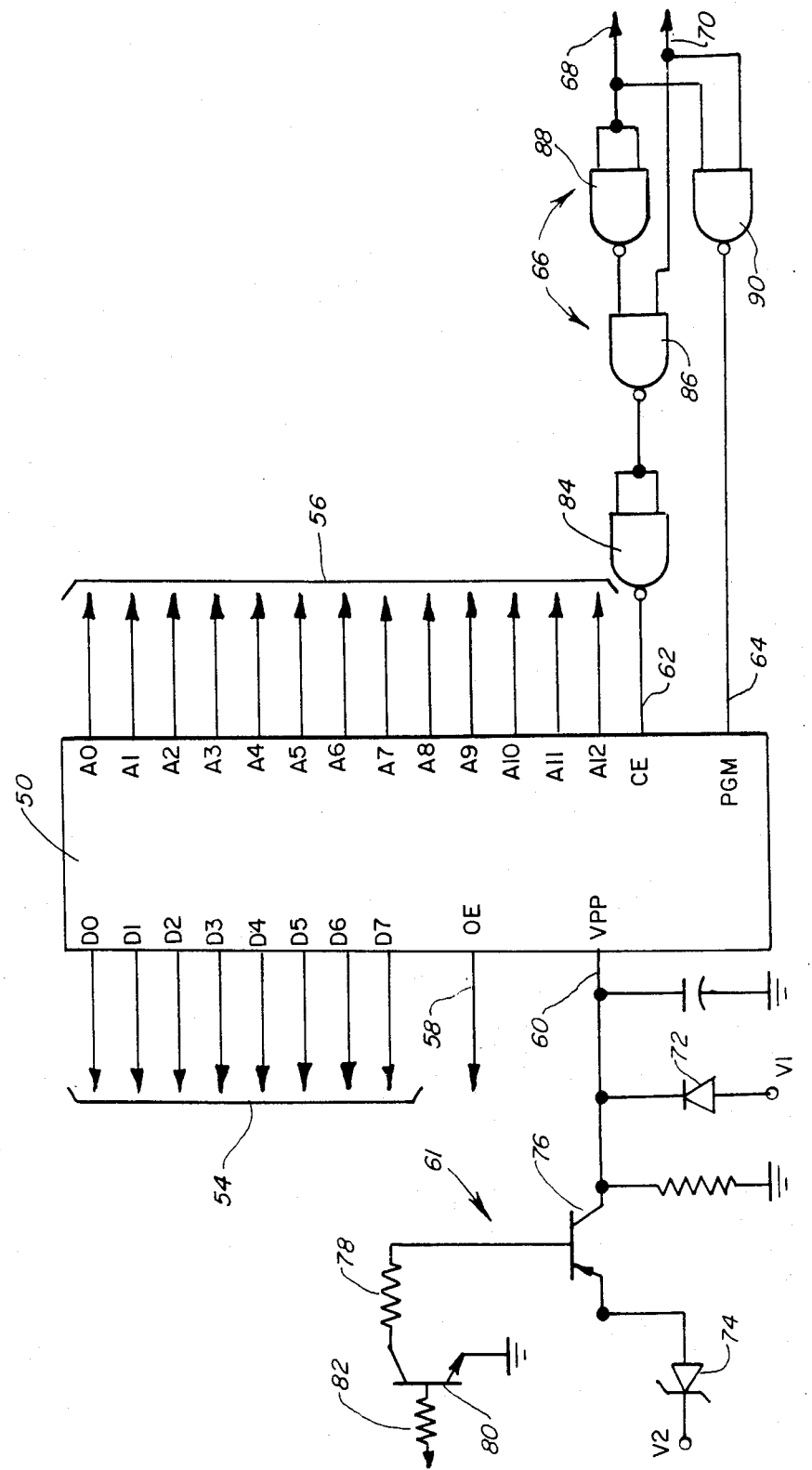
FIG. 5 is a block logic diagram of one embodiment of the memory package circuit including its interface circuit.
Figure 6:
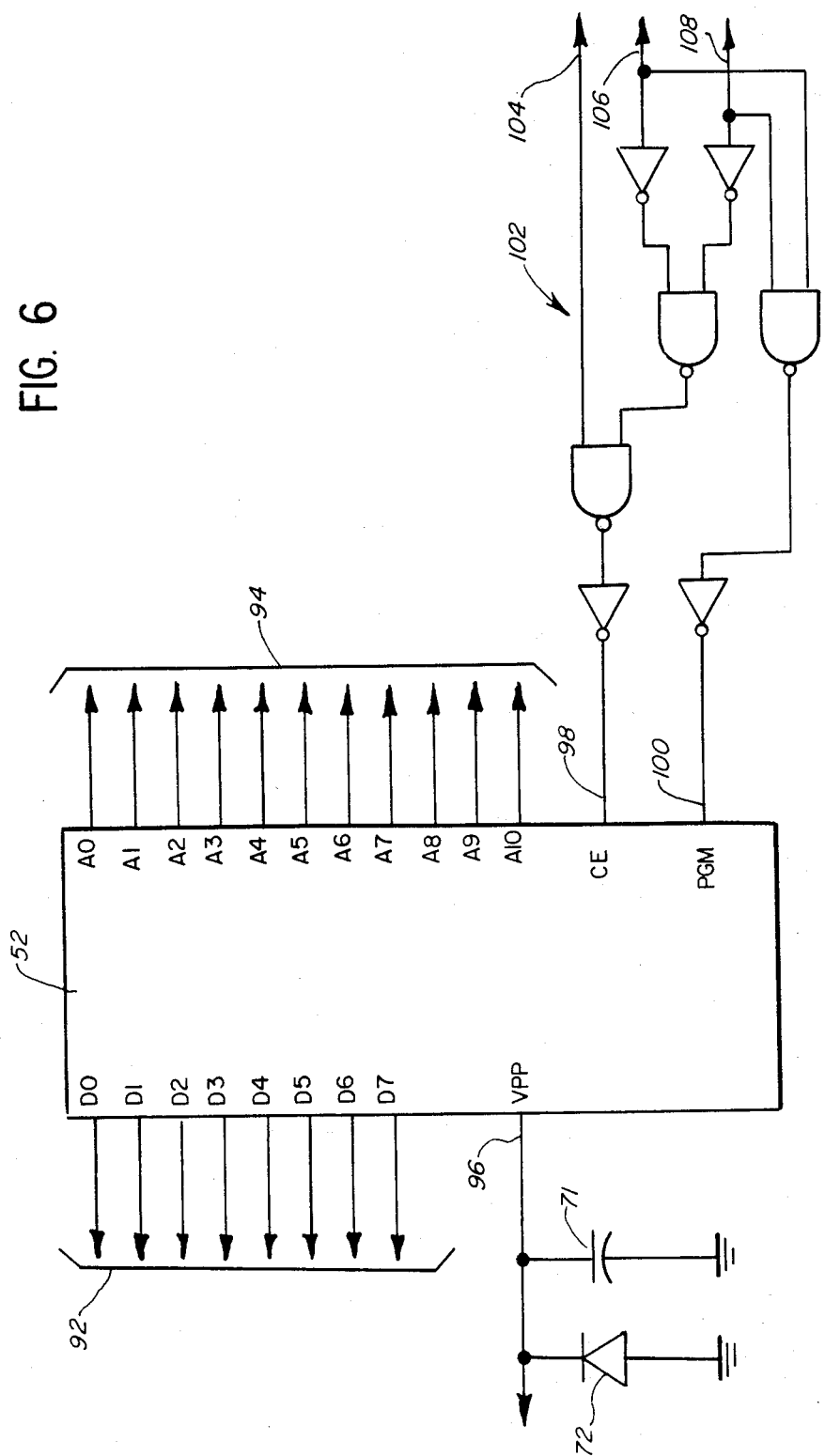
FIG. 6 is a block logic diagram of another embodiment of the memory package circuit including its interface circuit.

Shown in FIGS. 5 and 6 are alternate preferred embodiments of the memory package 12. In FIG. 5, an ultra-violet erasable PROM, or UVPROM, 50 is employed as the memory element 28, and in FIG. 6, an electrically erasable PROM, or EEPROM, 52 is employed as the memory element 28. Referring first to FIG. 5, the UVPROM 50 may comprise any number of available memory devices, but an INTEL 2764 made by INTEL Corporation and having an $8K \times 8$ bit memory capacity has been sucessfully employed. This UVPROM 50 has eight data input/output terminals coupled to interface switching circuit 37; thirteen address terminals 56 also coupled to the interface switching circuit 37; an output enable terminal 58 coupled to the interface switching circuit 37; a DC power input terminal 60; a clear enable input 62; and a program input terminal 64.

The control enable input 62 and the program input 64 are coupled to a memory package interface circuit 66 which, in turn, has two inputs 68 and 70 which are coupled to the interface switching circuit 37 and controlled thereby.

The DC power input terminal 60 receives DC power at a relatively low DC voltage V1, such as five volts, through a diode 72 during standby or readout. When the UVPROM 50 is being programed, on the other hand, DC power is applied to DC power input terminal 60 through a PNP resistor 76 and a zener diode 74 from a source of power at a relatively high DC voltage V2, such as twenty-five volts. Transistor 76 has its base coupled through a resistor 78 to another transistor 80 which, in turn, has its base coupled through a resistor 82 to the interface switching circuit 37. During programming, the microprocessor 35 causes the transistor 80 to turn on by having a 1-state pulse applied thereto by the interface switching circuit 37. This causes a 0-state pulse to be applied to the base of transistor 76 which causes it to turn on and apply the relatively higher voltage V2 to DC power input terminal 60. At other times, transistors 80 and 76 are kept off and power is applied to DC power input 60 through diode 72 at the relatively lower voltage V1. The memory package interface circuit 66 comprises four NAND gates 84, 86, 88 and 90. The output of NAND gate 90 is coupled to program input 64 and has its two inputs respectively coupled to input terminals 68 and 70. These input terminals are coupled to the data entry microprocessor 35 and are controlled thereby to provide the appropriate logic signals to program input 64 during programming. Likewise, NAND gates 88, 86 and 84 are controlled by the microprocessor 35 to supply the necessary logic signal to the clear enable input 62 as needed to clear the memory as desired immediately prior to programming. The microprocessor 35 also functions to control the output enable input 58 to disable the outputs 54 from producing output signals during programming.

In operating the data entry panel to transfer memory to or from the logic panel memory or the tape cassette, the operator first actuates the push button switch labeled "Data Transfer" at the function keyboard 36. This activates the microprocessor to enter into one of its subprograms, and it will thereafter display a plurality of possible data transfer functions that the operator can select including one labeled "SAVE". Upon selecting the "SAVE" function, the microprocessor will cause to be displayed on LED display 38 a choice of whether the operator wishes to "SAVE" to the magnetic tape cassette or to the memory package. Upon the operator actuating selection for saving to the memory package, the microprocessor will enter into the appropriate subprogram and when ready to procede will ask the operator through the display to initiate the transfer by actuating a function which is labeled "ENTER". When this is done, the microprocessor will first cause the memory to be erased. Then, the transistor 80 is actuated to cause the application of the relatively higher voltage V2 to the DC supply input 60. Data is then transferred in accordance with the algorithms of FIGS. 7A and 7B as will be described hereafter.

If it is decided to read out of the memory pack into the logic panel program memory, then the operator selects this different function for the microprocessor by actuation of the appropriate key in the function keyboard 36. When the appropriate subprogram has been finally selected by the operator to achieve this function, the program will be read from the memory package in accordance with the algorithm of FIG. 7C. The program generally takes approximately only two and a half minutes to effect transfer as opposed to the two to four hours to reprogram.

During programming, the various addresses for the data locations are internally generated by the UVPROM as the data is presented to the data input/output terminals 54. During readout of the program from the UVPROM 50 to the user's portion of memory in the logic panel, the various addresses are sequenced by the microprocessor 35 to produce the memory on output terminals 54 for transfer to the logic panel memory.

Referring to FIG. 6, the EEPROM 52 and its associated interface circuitry is substantially similar to the UVPROM 50 and associated circuitry of FIG. 5. The EEPROM 52 may comprise any number of devices, but a Hitachi 48016 EEPROM having a memory capacity of 2K×8 bits has been found to work successfully.

The EEPROM 52 has eight data input/output terminals 92, but only eleven addressing terminals 94. The EEPROM 52, in this instance, has a smaller memory than the UVPROM 50 and accordingly has fewer address locations and a correspondingly lesser requirement for addressing inputs. The UVPROM because of its greater capacity can carry a plurality of files of data. During operation, only the last file may be accessed by the microprocessor 35.

Like the UVPROM 50, the EEPROM 52 has a DC supply terminal 96, a clear enable input 98 and a program input 100. The power supply input 96 is coupled to a circuit identical to the switched power supply circuit 61 of FIG. 5, and only diode 72 and the capacitor 71 of this circuit are shown. Also similar, the EEPROM 52 has an associated interface circuit 102 with inputs 104, 106 and 108 coupled with and controlled by the microprocessor 35 to appropriately control the logic levels applied to inputs 98 and 100 as appropriate for the various functions being performed.

While a particular embodiment has been disclosed herein, it should be appreciated that many variations may be made without departing from the scope of the invention, as defined in the claims. For instance, while a welder control application has been disclosed in reference to the preferred embodiment, it should be appreciated that the memory package may be used in a wide variety of applications in which it is desired to have a removable electronic memory package.

I claim:

1. A memory package for connection to an interface switching circuit of a programmable controller for receiving a program from the programmable controller, storing the program at a location that may be remote from the programmable controller, and returning the program to the programmable controller, the memory package comprising:

An erasable programmable read-only memory (EPROM);

a releasable holder supporting the EPROM physically and connected electrically to it; and means for effecting an electrical connection between the releasable holder and the programmable controller to connect the programmable controller electrically to the EPROM to store a program from the programmable controller in the EPROM and to read a program from the EPROM into the programmable controller.

2. The memory package of claim 1 wherein the EPROM is an electrically erasable programmable read-only memory.

3. The memory package of claim 1 wherein the EPROM is an ultraviolet-erasable programmable read-only memory.

* * * * *